(12) United States Patent
Grebenik et al.

(10) Patent No.: US 8,255,419 B2
(45) Date of Patent: Aug. 28, 2012

(54) EXCLUSIVE SCOPE MODEL FOR ROLE-BASED ACCESS CONTROL ADMINISTRATION

(75) Inventors: Vladimir V. Grebenik, Redmond, WA (US); Pretish Abraham, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/485,954

(22) Filed: Jun. 17, 2009

(65) Prior Publication Data

US 2010/0325160 A1 Dec. 23, 2010

(51) Int. Cl.
*G06F 17/30* (2006.01)
*G06F 7/00* (2006.01)

(52) U.S. Cl. ........ 707/783; 707/955; 707/959; 707/805; 707/812

(58) Field of Classification Search .................... 707/783
See application file for complete search history.

(56) References Cited

U.S. PATENT DOCUMENTS

| | | | |
|---|---|---|---|
| 6,526,513 B1 * | 2/2003 | Shrader et al. ............ | 726/4 |
| 7,546,633 B2 * | 6/2009 | Garg et al. ............... | 726/4 |
| 7,720,831 B2 * | 5/2010 | Yang et al. ............. | 707/705 |
| 7,827,615 B1 * | 11/2010 | Allababidi et al. ........ | 726/28 |
| 2003/0229623 A1 * | 12/2003 | Chang et al. ............ | 707/3 |
| 2005/0055573 A1 | 3/2005 | Smith | |
| 2005/0138420 A1 * | 6/2005 | Sampathkumar et al. .... | 713/201 |
| 2005/0289234 A1 * | 12/2005 | Dai et al. .............. | 709/229 |
| 2007/0283443 A1 * | 12/2007 | McPherson et al. ........ | 726/26 |
| 2008/0016580 A1 | 1/2008 | Dixit et al. | |
| 2008/0034438 A1 * | 2/2008 | Mireku ................. | 726/27 |
| 2008/0243856 A1 | 10/2008 | Corley et al. | |
| 2008/0263370 A1 * | 10/2008 | Hammoutene et al. ..... | 713/193 |
| 2008/0271139 A1 | 10/2008 | Desai et al. | |
| 2009/0007249 A1 | 1/2009 | Lu et al. | |

OTHER PUBLICATIONS

Anne Anderson, "Core and Hierarchical Role Based Access Control (RBAC) Profile of XACML V2.0", Feb. 1, 2005.*
Muhammad Nabeel Tahir, Hierarchies in Contextual Role-Based Access Control Model (C-RBAC), 2008.*
"Role-Based Access Controls", Retrieved at <<http://csrc.nist.gov/groups/SNS/rbac/documents/ferraiolo-kuhn-92.pdf>>, 15th National Computer Security Conference (1992), Baltimore MD, pp. 554-563.
McPherson Dave, "Role-Based Access Control for Multi-tier Applications Using Authorization Manager", Retrieved at <<http://technet.microsoft.com/en-us/library/cc780256.aspx>>, Jul. 31, 2004.
Xu, et al., "Multi-Session Separation of Duties (MSoD) for RBAC", Apr. 17-20, 2007, IEEE 23$^{rd}$ Int'l Conference on Data Engineering Workshop, http://sec.cs.kent.ac.uk/permis/documents/SecobapFinal.pdf.
Chadwick, et al., "RBAC Policies in XML for X.509 based Privilege Management", May 7-9, 2002, SEC ' 02 Proceedings of the IFIP TC11 17$^{th}$ Int'l Conference on Information Security: Vision and Perspectives, Retrieved at http://sec.cs.kent.ac.uk/download/Sec2002Final.pdf, pp. 39-54.

* cited by examiner

*Primary Examiner* — Binh V Ho
(74) *Attorney, Agent, or Firm* — Hope Baldauff Hartman, LLC (57) ABSTRACT

Architecture that creates a class of role-based scopes that can be declared "exclusive", which automatically means that no user can access the scope unless the user is granted that exact scope. The exclusive scope excludes an object from the new scopes and existing scopes. In other words, the exclusive scope is a write restriction from a domain scope. The exclusive scope denies user access unless the user is granted the exclusive scope. The exclusive scope can be applied to a group of user objects. The exclusive scope is explicitly assigned to the object to grant access to an exclusive group. Moreover, the exclusive scope is immediately write-protected upon creation.

13 Claims, 8 Drawing Sheets

EXCLUSIVE SCOPE MODEL FOR ROLE-BASED ACCESS CONTROL ADMINISTRATION

BACKGROUND

The administration of services in organizations is becoming increasingly resource intensive and complicated due to the many services deployed in and across the enterprise. Role-based access control (RBAC) is an alternative methodology that assigns administrators and users to roles that relate to job functions. Users acquire permissions through the role, and hence, are not assigned the permissions directly. While users and permissions may change frequently, roles are comparatively stable, and thus, simply administration.

An administrator can modify the role, but thereafter, over a period of time and perhaps several role modifications, it is difficult to know whether the role has a smaller or larger set of permissions. Thus, permission auditing is problematic. In an access control list (ACL) regime this modification is performed by adding access control entries, which are difficult to audit. In RBAC, modification can be accomplished by adding and removing actions. However, ensuring consistency and order between roles is not possible. In other words, permission auditing is a reactive measure once accidents are found and unintended access to extremely important objects was given. New role modification or ACLs can still accidentally override the previously set permissions.

Although the general RBAC model may work adequately for the general application, administration lacks the ability to provide more focused role management for specific individuals, to exclude certain objects, such as high-level employees and managers such as company executives, for example. The RBAC model provides filtering as an approach to attempting more focused administration; however, this means that each time a new scope is defined a new filter needs to be added that excludes such objects. This is a burdensome and error-prone effort. Moreover, a new administrator may not readily be aware of such restrictions, and impose rules and roles that mishandle these objects.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture creates a class of role-based scopes that can be declared "exclusive", which automatically means that no user can access the resource(s) (or resource objects) specified in the scope unless the user is granted that exclusive scope. The exclusive scope excludes a set of resource objects from new scopes and existing scopes. The scope can cover a set of user and/or configuration objects, since the concept can cover both executive users or highly protected configuration objects such as certain servers, and databases (e.g., where executive data is stored). Moreover, the exclusive scope can be immediately write-protected upon creation.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture creates a class of RBAC (role-based access control) scopes that can be declared "exclusive", which automatically means that no user can access the exclusive scope unless the user is granted that exact scope. A role is defined as a list of tasks and code (e.g., scripts) that can be run by a user assigned to this role. A scope is a set of objects on which tasks defined in the role can operate. Roles comprise actions (also referred to as cmdlets or "commandlets") and action parameters.

For example, in order to create new mailbox, an administrator needs to be granted a number of permissions. The administrator can be granted a "new-mailbox" action with certain parameters, and will not need to be concerned about individual permissions. This is possible because permissions are granted as a role (a unit of permission assignment is a role), which consists of multiple entries. These entries correspond to end-user actions and are not related to implementation-dependent resource rights. These actions can be web services or API calls, script or executable file names, cmdlets and parameters, etc., essentially any action that an end-user performs.

In existing access-based solutions, the implementation of mailbox creation requires granting write access to the store database, directory services, and other files on the server. With RBAC, implementation-specific knowledge and permissions are no longer required; hence, providing the capability to abstract it completely from the administrator. With RBAC, administrators only need to understand the delegation of actions and scopes.

The exclusive scope addresses the situation of exclusivity for specific users or groups of users (e.g., executives) and prevents the possibility of errors when new administrators, for example, are exposed to RBAC for the enterprise and inadvertently expose executive resources to unintended users (e.g., low-level administrators) that would otherwise not be availed of the exclusive scopes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
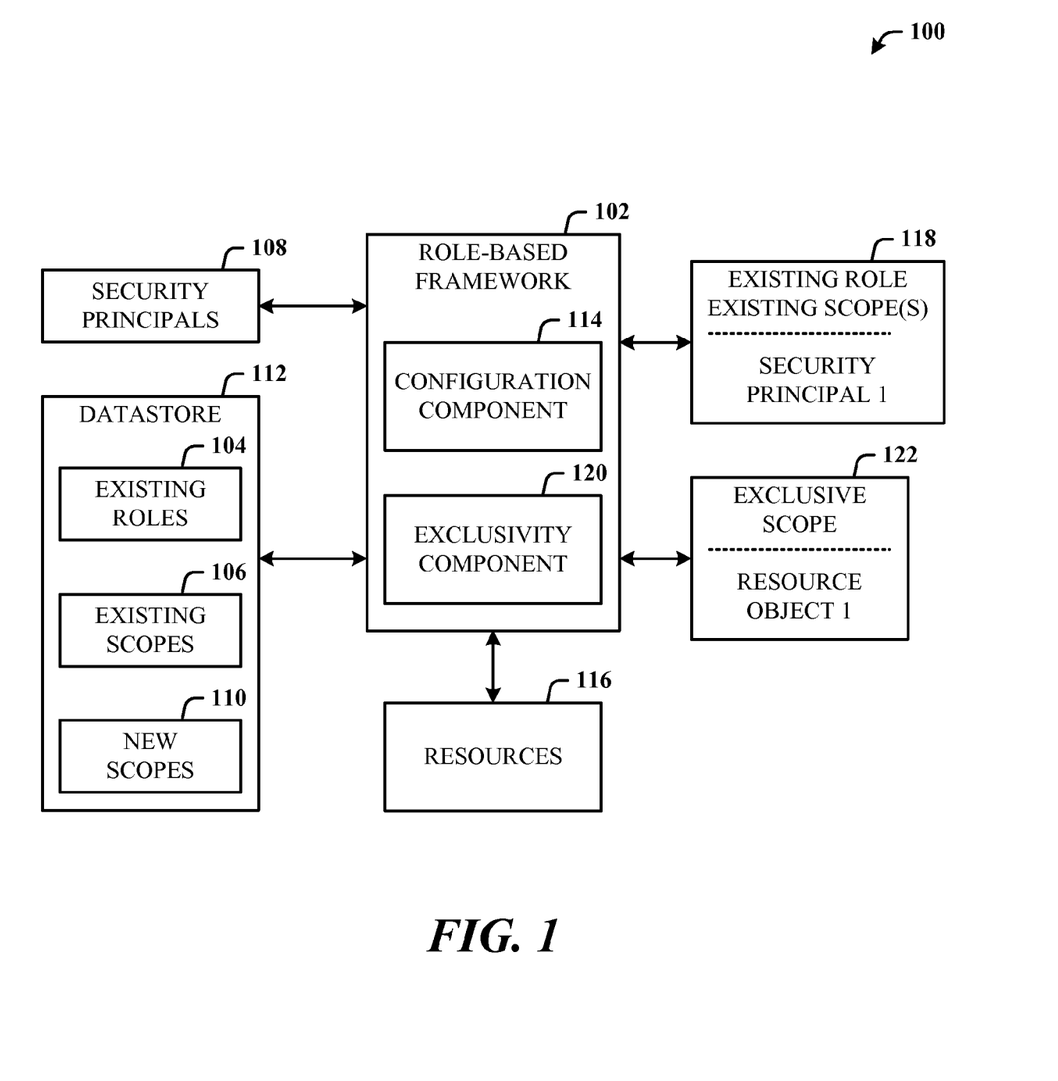
FIG. 1 illustrates a computer-implemented permissions system in accordance with the disclosed architecture.

FIG. 1 illustrates a computer-implemented permissions system 100 in accordance with the disclosed architecture. The system 100 includes a role-based framework 102 for assigning existing roles 104 and existing scopes 106 to security principals 108 to allow access to resources 116 of an organization. The existing roles 104, existing scopes 106, and new scopes 110 can be stored in a datastore 112. The datastore 112 can be local and/or centrally located.

The role-based framework 102 includes a configuration component 114 for assigning the existing roles 104, existing scopes 106, and new scopes 110 to one or more of the security principals 108 and configuration thereof, for controlling access to the resources 116. A role and scope are assigned to security principals that are users or computers authorized by the role-based framework to run actions defined by the role upon any resource object defined by the scope. Thus, an output of the role-based framework 102 can be an existing role 118 assigned to a first security principal and having one or more existing scopes that grant access to one or many resource objects. A resource object can be a computer, file, or user object (or any object defined in a storage system), for example.

The role-base framework 102 can also include an exclusivity component 120 for defining a scope as exclusive (an exclusive scope 122) to exclude one or more resources (also referred to as resource objects) from the scopes (existing scopes 106 and new scopes 110). The exclusive scope 122 excludes the one or more resources from the existing scopes 106. The exclusive scope 122 excludes the one or more resources from the new scopes 110. The exclusive scope 122 is a write restriction based on a configuration scope (e.g., servers) and/or a domain scope (e.g., an organizational unit (OU) container of users). The exclusive scope 122 denies user access to the one or more resources unless the user is granted the exclusive scope 122. The exclusive scope 122 can be applied to a group of the resources (e.g., user objects and/or configuration objects). The exclusive scope 122 is explicitly assigned to the security principal in order to grant access to the exclusive group of the resource. Moreover, the exclusive scope 122 is immediately write-protected upon creation.

Each role includes one or more role entries that define the permissions for that role. The configuration component 114 enables modification of the existing roles 104 by adding or removing role entries. The role includes the permissions, which are entries in a role (e.g., existing roles 104), and each entry includes an action (also referred to as a cmdlet or "commandlet") and an action parameter.

The existing roles 104 are stored as a catalog of roles. The catalog includes a list of entries of existing roles, role type information for denoting a purpose of a role, read limitations on which resource object a read operation can be applied, and/or write limitations on which resource object a write operation can be applied.

The system 100 can be applied to the administration of different applications, such as associated with a messaging infrastructure that includes email accounts and mailbox resources.

Figure 2:
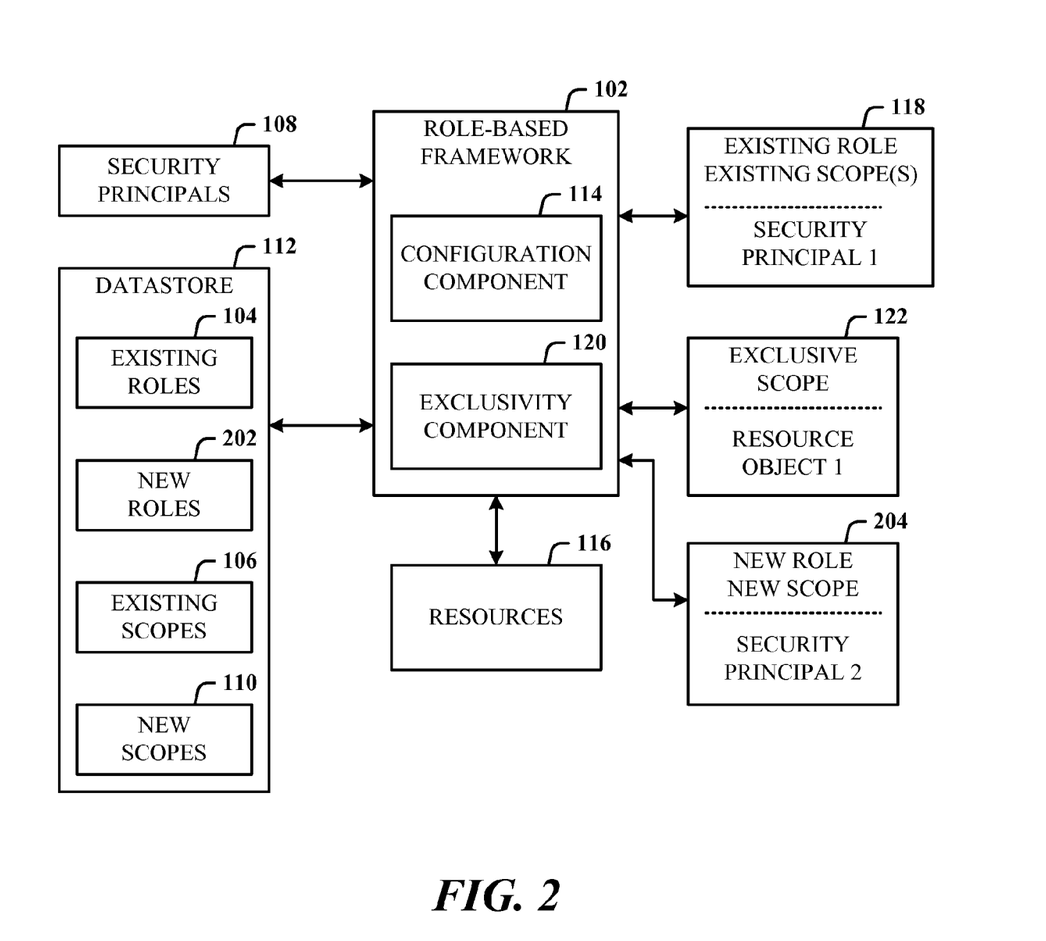
FIG. 2 illustrates permissions system that employs exclusive scopes and the ability to create new roles in accordance with the disclosed architecture.

FIG. 2 illustrates permissions system 200 that employs exclusive scopes and the ability to create new roles 202 in accordance with the disclosed architecture. The system 200 includes the entities and components of the system 100 of FIG. 1, but further, the ability of the configuration component 114 to create and configure the new roles 202. The existing roles 104, new roles 202, existing scopes 106, and new scopes 110 can be stored in the datastore 112, which can be local or centrally located. The system 200 can be applied to the administration of different applications, such as associated with a messaging infrastructure that includes email accounts and mailbox resources. For example, a new role assignment 204 for a second security principal can be created. In other words, new roles can be created and the new roles and scope assigned to security principals. However, exclusive objects are off limits from these new scopes. In other words, the Security Principal 2 specified in role assignment 204 will not be able to access Resource Object 1.

Put another way, a computer-implemented permissions system is provided that comprises a role-based framework for granting permission to run actions against resources based on roles and scopes, and an exclusivity component for defining a scope as exclusive, in order to exclude a set (one or more) of resources (also referred to as resource objects) (e.g., user object, server, executive users, computer, file, other object of storage system, etc.) from existing or future new scopes, the exclusive scope is immediately write-protected upon creation.

The exclusive scope denies user access unless the user is granted the exclusive scope. The exclusive scope is explicitly assigned to the security principal to grant access to the exclusive set of resource objects. In other words, a separate role assignment for Security Principal 2 with explicit assignment to exclusive scope 122 is required in order to access Resource Object 1.

Figure 3:
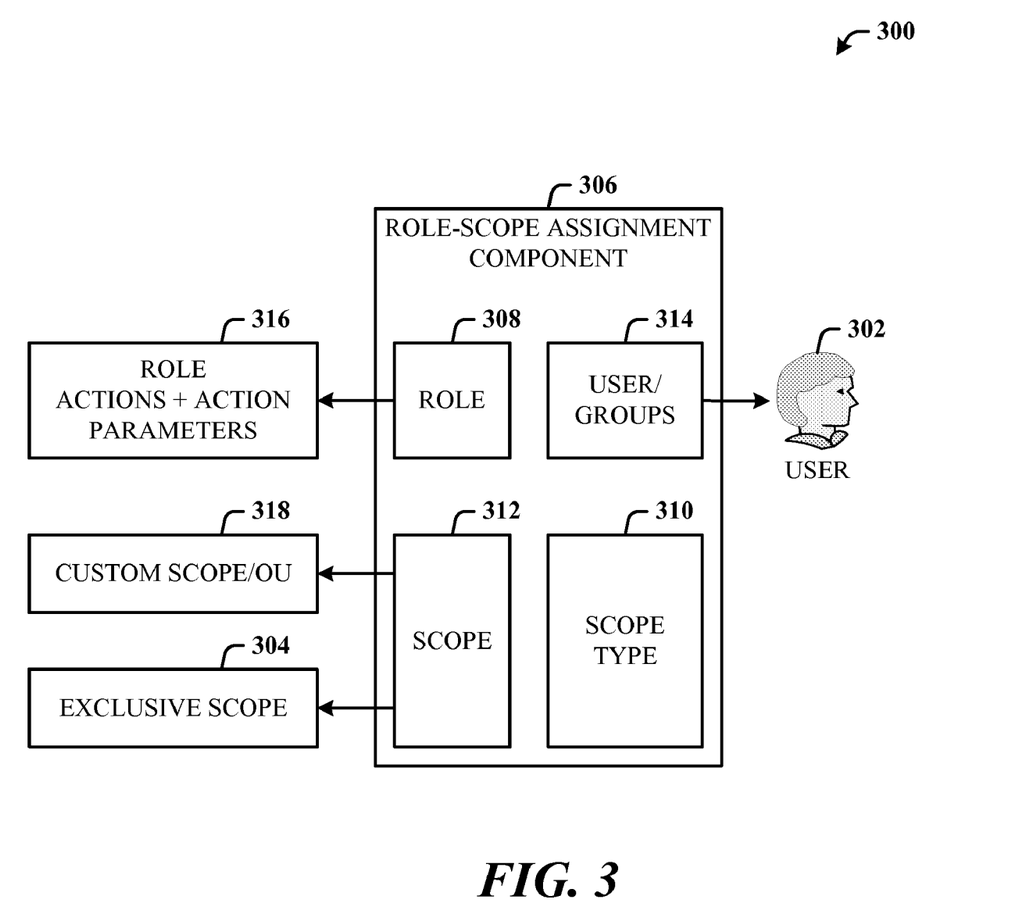
FIG. 3 illustrates a system for role and scope assignment to a user and that further includes an exclusive scope.

FIG. 3 illustrates a system 300 for role and scope assignment to a user 302 and that further includes an exclusive scope 304. The exclusive scope 304 addresses the issue of securing access to certain objects such as executives. The end result is that the exclusive scope 304 does not have to be manually excluded from the existing and new scopes. The system 300 includes a role-scope assignment component 306 for defining a role 308, scope type 310, scope 312 for the scope type 310, and then assigning the role 308 and scope 312 to a user (e.g., user 302) or groups of users. The role 308 includes role actions and action parameters 316 that define the permissions associated with the role 308. The system 300 also includes derivations of the scope 312, which comprise a custom scope or an organizational unit (OU) scope 318.

In order to designate a set of objects as "special", a new scope is created with an "exclusive" flag. Once this is done, the objects are automatically excluded from all other scopes. In order to grant access to these objects an administrator needs to explicitly assign the newly-defined scope to a user or group. For example, assume an over-arching scope "everyone", which includes all the user objects in the organization. If an exclusive scope is defined as "everyone from the Marketing Department", then the over-arching "everyone" scope no longer includes Marketing employees. The exclusive Marketing scope is explicitly assigned to a user in order to grant access to this department.

In one example, an "exclusive" type can be used on a management scope, (e.g., new-managementscope) that specifies if type=Recipients, OU is specified and a filter is not. Because the exclusive flag is specified, all the objects under the OU fall under the exclusive scope.

Unlike regular scope restrictions that have no effect until associated with users/roles, the exclusive scope restriction marks that OU as exclusive, immediately; that is, the moment the scope is created, all objects under the "Executive Users" OU, for example, becomes write-protected for any role. An administrator associates this scope with all "write" actions in order to restore functionality. This is the same for the server.

The exclusive scope 304 can be implemented by way of simply a bit in an OU scope. The exclusive scope 304 can only be used as a write restriction from domain scopes.

Each "write recipient" action (cmdlet) during scope evaluation first checks if there are any exclusive scopes registered in the organization. If there are, the action checks if the current object belongs to an exclusive scope. If it does, a check is made to determine if the scope is assigned to the user as an exclusive scope for this particular action, and in this case, access is granted; otherwise, access is denied.

It is likely that the users granted access to an exclusive OU perform the same role in other scopes as well (e.g., mailbox administrators for executives likely have the same permissions in other OUs). Thus, there can be two role assignments: one general (e.g., organization-wide), and one exclusive. Following are options that can be employed. First, an -exclusive flag can be used on an add role assignment (e.g., add-roleassignment) that can be specified only if -restrictChangesTo is specified and the OU is passed as the write restriction. This way, no additional work is needed—this assignment automatically gives the desired exclusive right to run actions in the specified role on the specified OU. Actions outside of that role are still able to write to that OU without restrictions.

In a second option, the add-roleassignment can be used without the role together with the -exclusive flag (that can be specified only if -restrictChangesTo is specified and OU is passed as the write restriction). The benefit of this approach is that if a user/group is assigned multiple roles within the OU, there are fewer role assignments involved (as a single exclusive assignment will be used for all the role assignments). The OU becomes write-locked for everybody to whom this role assignment is not applied, regardless of the actions. For example, if the Redmond OU as marked as exclusive and only users with MoveMailbox role are assigned to this scope, it means that the rest of recipient management is blocked until more people are added to that exclusive scope (or other roles are given to the existing users who are assigned this scope). In another example, if "Executive OU" is marked as an exclusive scope and only Joe, an organization administrator, is assigned to this scope, then all other administrators are blocked from accessing executives regardless of their role and scope rights.

In a third option, the exclusive type can be used on new-scoperestriction that can be specified if type=Recipients, OU is specified, and filter is not. Unlike regular scope restrictions that have no effect until associated with users/roles, the exclusive scope restriction marks that OU as exclusive, immediately; that is, the moment the OU is created, that OU becomes write-protected for any role and any administrator. An administrator associates this scope with all write actions in order to restore functionality. In other words, once in lockout mode where an exclusive scope is defined without granting the scope to anyone, only an organization administrator can associate the exclusive scope and role to other administrators to restore functionality.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
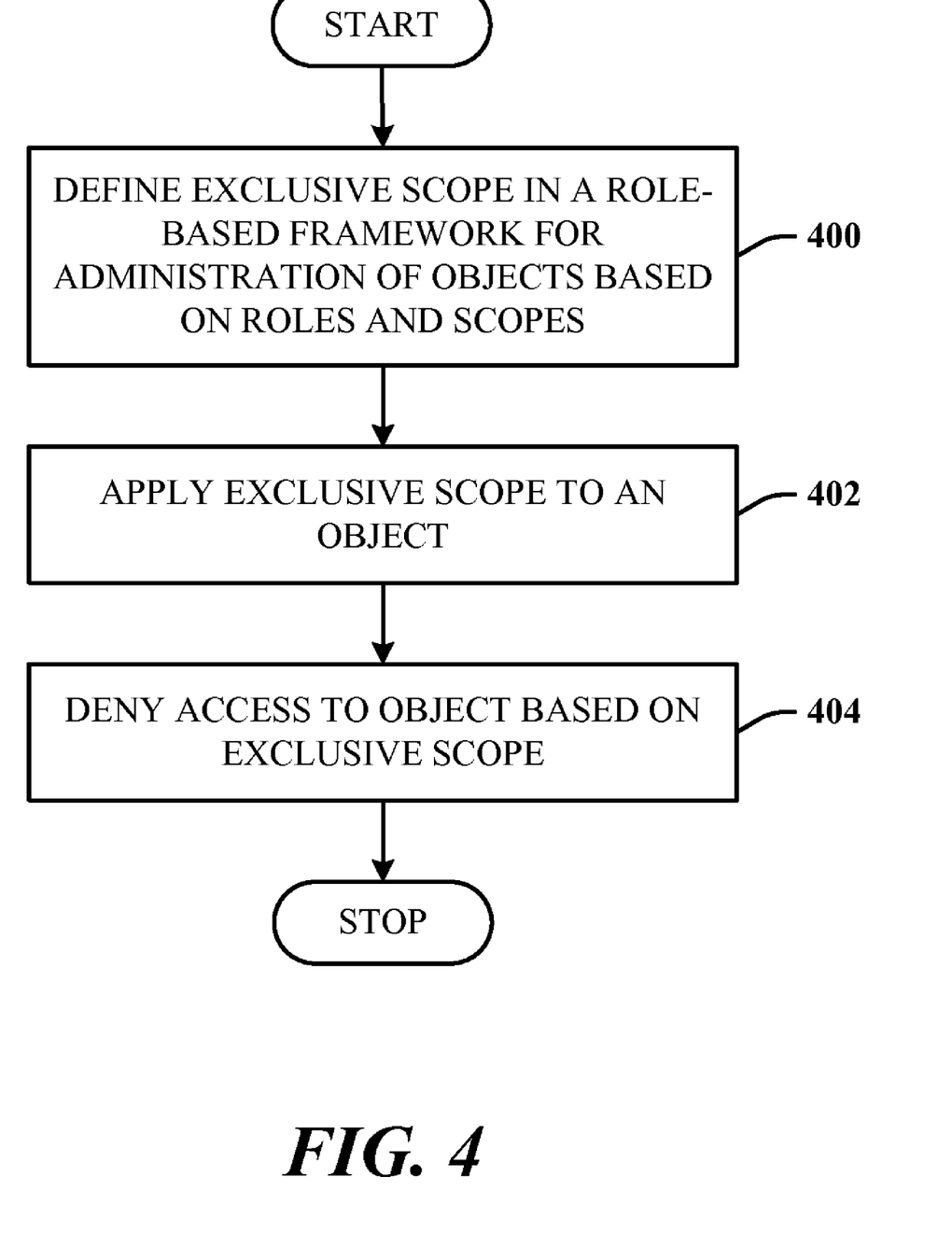
FIG. 4 illustrates a computer-implemented permission method.

FIG. 4 illustrates a computer-implemented permission method. At 400, an exclusive scope is defined in a role-based framework for administration of objects based on roles and scopes. At 402, the exclusive scope is applied to an object. At 404, access to the object is denied based on the exclusive scope.

Figure 5:
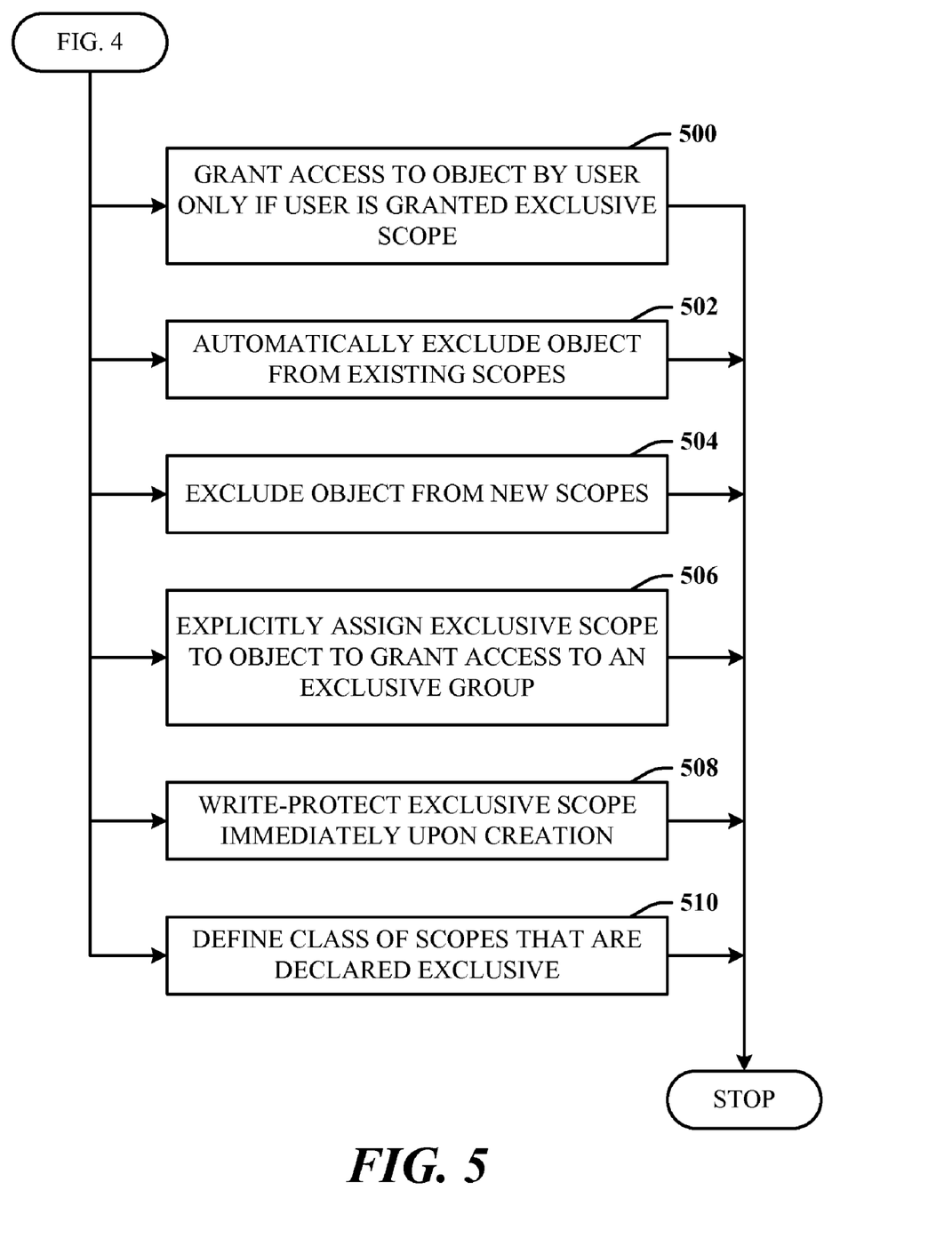
FIG. 5 illustrates further aspects of the method of FIG. 4.

FIG. 5 illustrates further aspects of the method of FIG. 4. At 500, access is granted to the object by a user only if the user is granted the exclusive scope. At 502, the object is automatically excluded from existing scopes. At 504, the object is excluded from new scopes. At 506, the exclusive scope is explicitly assigned to the object to grant access to an exclusive group. At 508, the exclusive scope is write-protected immediately upon creation. At 510, a class of scopes is defined that is declared exclusive.

Figure 6:
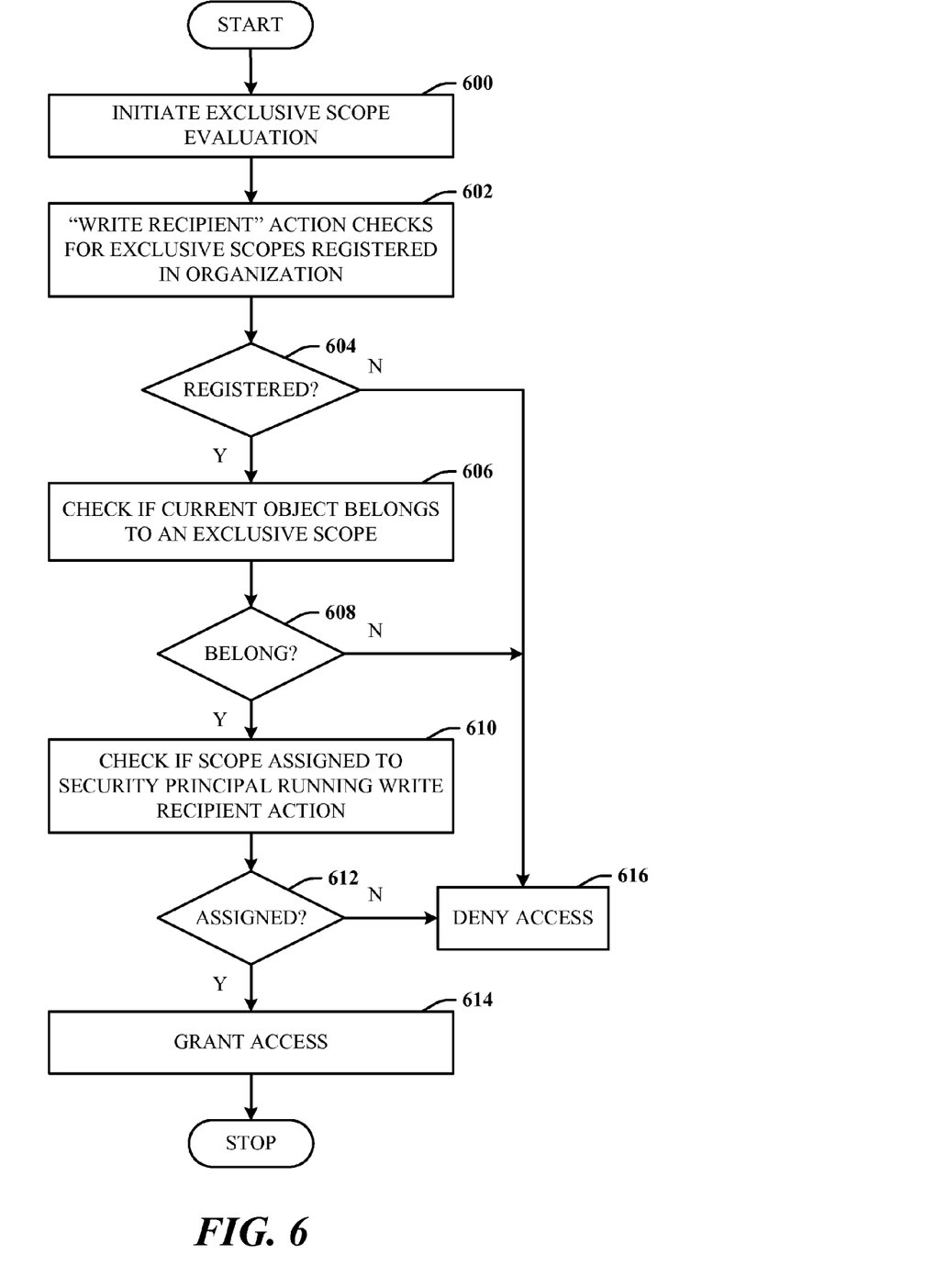
FIG. 6 illustrates a method of scope processing.

FIG. 6 illustrates a method of scope processing. At 600, exclusive scope evaluation is initiated. At 602, each "write recipient" action (cmdlet), during scope evaluation, checks for exclusive scopes registered in an organization. At 604, if there are registered exclusive scopes, flow is to 606 to check if the current object belongs to an exclusive scope. At 608, if so, flow is to 610 to check if the scope is assigned to a security principal running the write recipient action. At 612, if assigned, flow is to 614 to grant access. At 604, if no exclusive scopes are registered in the organization, access is denied, as indicated at 616. Similarly, at 608, if the current object does not belong to an exclusive scope, access is denied, as indicated at 616. At 612, if the scope is not assigned as an exclusive scope for this action, again, access is denied, as indicated at 616.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
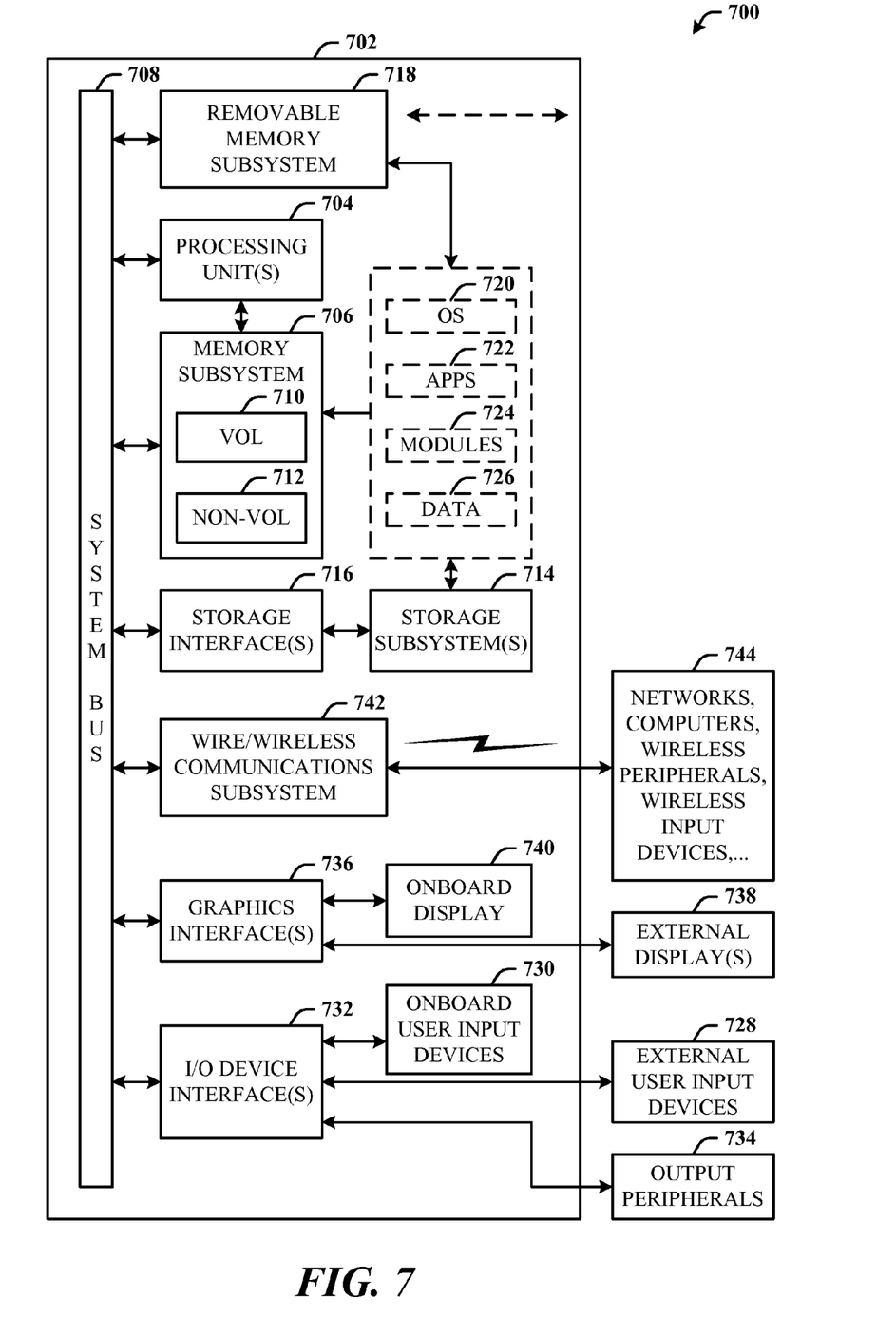
FIG. 7 illustrates a block diagram of a computing system operable to create and employ exclusive scopes in accordance with the disclosed architecture.

Referring now to FIG. 7, there is illustrated a block diagram of a computing system 700 operable to create and employ exclusive scopes in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include one or more of the entities and components of the system 100 of FIG. 1, one or more of the entities and components of the system 200 of FIG. 2, the system 300 of FIG. 3, and the methods represented by the flow charts of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
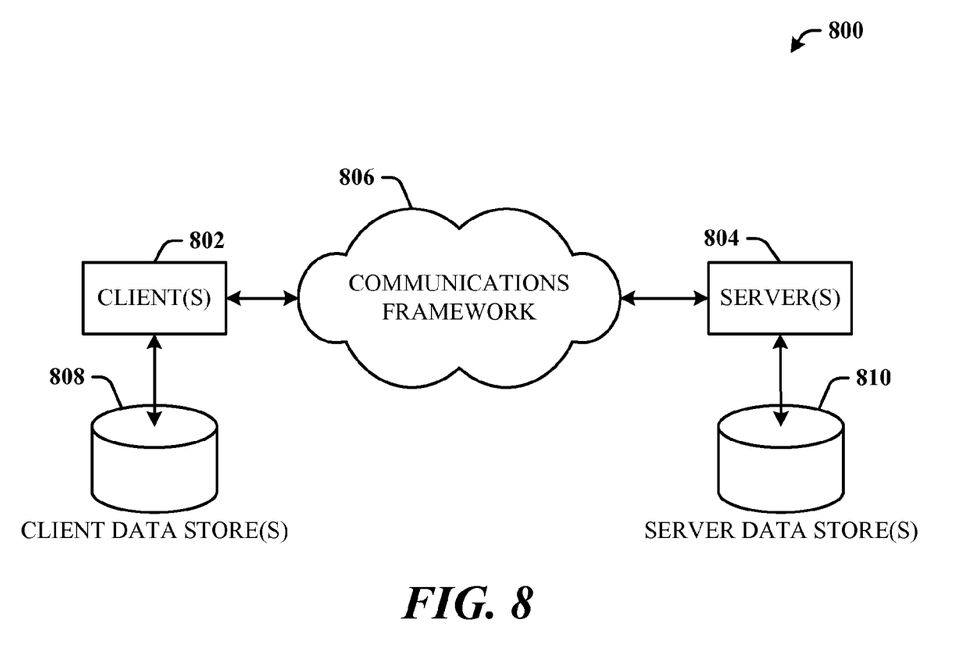
FIG. 8 illustrates a schematic block diagram of a role-based computing environment for creating and employing exclusive scopes.

Referring now to FIG. 8, there is illustrated a schematic block diagram of a role-based computing environment 800 for creating and employing exclusive scopes. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented permissions system, comprising:
   a processor executing a first process comprising a role-based framework for granting permission to run actions against resources based on roles and a plurality of scopes said plurality of scopes comprising a particular scope and a remainder of scopes,
   the processor further executing a second process comprising an exclusivity component for defining the particular scope as an exclusive scope explicitly assigned to a security principal to grant access to an exclusive group of the resources, wherein one or more of the resources are excluded from being accessed by the remainder of scopes and the exclusive scope is immediately write-protected upon creation.

2. The system of claim 1, wherein the exclusive scope excludes the one or more resources from new scopes.

3. The system of claim 1, wherein the exclusive scope is a write restriction from a domain scope.

4. The system of claim 1, wherein the exclusive scope denies access by a user to the one or more resources unless the user is granted the exclusive scope.

5. The system of claim 1, wherein the exclusive scope is applied to a user to grant access to a group of the resources.

6. A computer-implemented permissions system, comprising:
   a processor executing first process comprising a role-based framework for granting permission to run actions against resources based on roles and scopes based on roles and a plurality of scopes, said plurality of scopes comprising a particular scope and a remainder of scopes,
   the processor further executing a second process comprising an exclusivity component for defining an exclusive scope that is write-protected upon creation and excludes one or more of the resources from existing scopes and new scopes, and wherein the exclusive scope is explicitly assigned to a security principal to grant access to an exclusive group of the resources.

7. The system of claim 6, wherein the exclusive scope is a write restriction from a configuration scope or a domain scope.

8. The system of claim 6, wherein the exclusive scope denies user access to the one or more resources unless the user is granted the exclusive scope, the resources include at least one of a user object, a server, an executive user object, a computer, or a file.

9. A computer-implemented permission method, comprising:
   defining an exclusive scope in a role-based framework for administration of objects based on roles and scopes, and wherein the exclusive scope is explicitly assigned to a security principal to grant access to an exclusive group of the resources;
   applying the exclusive scope to an object;
   automatically excluding the object from all other existing scopes;
   write-protecting the exclusive scope immediately upon creation; and
   denying access to the object based on the exclusive scope.

10. The method of claim 9, further comprising granting access to the object by a user only if the user is granted the exclusive scope.

11. The method of claim 9, further comprising excluding the object from new scopes.

12. The method of claim 9, further comprising explicitly assigning the exclusive scope to the object to grant access to an exclusive group.

13. The method of claim 9, further comprising defining a class of scopes that is declared exclusive.

* * * * *